United States Patent
Tomizawa et al.

(10) Patent No.: US 12,175,771 B2
(45) Date of Patent: Dec. 24, 2024

(54) CONTROL SYSTEM FOR VEHICLE AND CONTROL METHOD FOR VEHICLE

(71) Applicant: TOYOTA JIDOSHA KABUSHIKI KAISHA, Toyota (JP)

(72) Inventors: Ryota Tomizawa, Susono (JP); Shozo Takaba, Chiryu (JP); Ayako Shimizu, Numazu (JP); Hojung Jung, Shizuoka-ken (JP); Daisuke Sato, Toyota (JP); Yasuhiro Kobatake, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 350 days.

(21) Appl. No.: 17/703,525

(22) Filed: Mar. 24, 2022

(65) Prior Publication Data

US 2022/0383647 A1  Dec. 1, 2022

(30) Foreign Application Priority Data

Jun. 1, 2021  (JP) .................................. 2021-092582

(51) Int. Cl.
*G06V 20/59* (2022.01)
*G06Q 20/14* (2012.01)
(Continued)

(52) U.S. Cl.
CPC ............. *G06V 20/59* (2022.01); *G06Q 20/14* (2013.01); *G06V 40/161* (2022.01); *B60R 7/04* (2013.01)

(58) Field of Classification Search
CPC .... G06V 20/59; G06V 40/161; G06V 40/168; G06Q 20/14; B60R 7/04; B60R 16/02; B60N 3/00
See application file for complete search history.

(56) References Cited

U.S. PATENT DOCUMENTS 11,263,887 B1 *  3/2022  Yamasaki ............ A61B 5/6893
11,780,376 B1 * 10/2023  Russell ..................... B60R 7/08
                                                       296/37.7
(Continued)

FOREIGN PATENT DOCUMENTS

CN       111325129 A       6/2020
IN    202011052676 A  * 12/2020
(Continued)

OTHER PUBLICATIONS

"NEC Launches Digital Office Project to Realize New Work Style in the New Normal Era with DX", NEC Corporation, https://jpn.nec.com/press/202007/20200713_01.html, Jul. 13, 2020, 5 pages.
(Continued)

*Primary Examiner* — Ping Y Hsieh
*Assistant Examiner* — Vaisali Rao Koppolu
(74) *Attorney, Agent, or Firm* — Dinsmore & Shohl LLP

(57) ABSTRACT

A control system for a vehicle includes a camera mounted on the vehicle and configured to take an image of an occupant of the vehicle, and an anti-droplet protective equipment providing device mounted on the vehicle and configured to provide anti-droplet protective equipment to the occupant, a determination unit configured to determine whether the occupant is wearing the anti-droplet protective equipment based on the image of the occupant taken by the camera, and a provision control unit configured to provide the anti-droplet protective equipment to the occupant with the anti-droplet protective equipment providing device when the determination unit determines that the occupant is not wearing the anti-droplet protective equipment.

6 Claims, 9 Drawing Sheets

(51) Int. Cl.
  *G06V 40/16*  (2022.01)
  *B60R 7/04*  (2006.01)

(56) References Cited

U.S. PATENT DOCUMENTS

2018/0238686 A1*  8/2018  Blacutt .................. G03B 15/00
2019/0279491 A9*  9/2019  Nelson ................... G16H 40/67
2021/0287539 A1*  9/2021  Cronje .................. G06F 18/214

FOREIGN PATENT DOCUMENTS

JP    2009-265722 A     11/2009
WO   WO-2022149354 A1 *  7/2022

OTHER PUBLICATIONS

Snyder, S.E., et al., "A Deep Learning Approach for Face Mask Detection to Prevent the COVID-19 Pandemic," SoutheastCon 2021, Atlanta, GA, USA, 2021, pp. 1-8, doi: 10.1109/SoutheastCon45413.2021.940187.

* cited by examiner

CONTROL SYSTEM FOR VEHICLE AND CONTROL METHOD FOR VEHICLE

CROSS-REFERENCE TO RELATED APPLICATION

This application claims priority to Japanese Patent Application No. 2021-092582 filed on Jun. 1, 2021, incorporated herein by reference in its entirety.

BACKGROUND

1. Technical Field

The present disclosure relates to a control system for a vehicle and a control method for a vehicle.

2. Description of Related Art

A device is known that takes a facial image of a driver of a vehicle and detects the orientation of the driver's face from the facial image. However, when the driver is wearing a mask, the orientation of the driver's face cannot be detected. There is a known device that determines whether the driver is wearing a mask and outputs a mask wearing alarm when determining that the driver is wearing a mask (for example, see Japanese Unexamined Patent Application Publication No. 2009-265722 (JP 2009-265722 A)).

SUMMARY

In JP 2009-265722 A, it is preferable that the driver be not wearing a mask from the viewpoint of detecting the orientation of the driver's face. However, considering measures against infectious diseases, for example, it is preferable that occupants (including the driver) of the vehicle be wearing masks. That is, for example, if a passenger getting into a shared vehicle is not wearing a mask, other passengers in the shared vehicle may feel uncomfortable. Alternatively, if a passenger getting into a shared vehicle does not have a mask, the passenger may hesitate to get into the shared vehicle. In any case, not wearing a mask may cause discomfort.

According to the present disclosure, the following are provided.

Configuration 1

A control system for a vehicle includes: a camera mounted on the vehicle and configured to take an image of an occupant of the vehicle; an anti-droplet protective equipment providing device mounted on the vehicle and configured to provide anti-droplet protective equipment to the occupant; a determination unit configured to determine whether the occupant is wearing the anti-droplet protective equipment based on the image of the occupant taken by the camera; and a provision control unit configured to provide the anti-droplet protective equipment to the occupant with the anti-droplet protective equipment providing device when the determination unit determines that the occupant is not wearing the anti-droplet protective equipment.

Configuration 2

In the control system according to configuration 1, the provision control unit is further configured to stop provision of the anti-droplet protective equipment by the anti-droplet protective equipment providing device when the determination unit determines that the occupant has put on the anti-droplet protective equipment after the determination unit determines that the occupant is not wearing the anti-droplet protective equipment.

Configuration 3

The control system according to configuration 1 or 2, further includes: an information acquisition device configured to acquire related information of the occupant; and a selection unit configured to select anti-droplet protective equipment that suits the occupant based on the related information of the occupant that is acquired by the information acquisition device. The provision control unit is further configured to provide the anti-droplet protective equipment selected by the selection unit to the occupant with the anti-droplet protective equipment providing device.

Configuration 4

The control system according to any one of configurations 1 to 3 further includes an estimation unit configured to estimate whether a risk of droplet infection in the vehicle is higher than a predetermined standard. The provision control unit is further configured to, when the determination unit determines that the occupant is not wearing the anti-droplet protective equipment, perform provision of the anti-droplet protective equipment to the occupant by the anti-droplet protective equipment providing device when the estimation unit estimates that the risk of droplet infection is higher than the standard, and stop provision of the anti-droplet protective equipment to the occupant by the anti-droplet protective equipment providing device when the estimation unit estimates that the risk of droplet infection is lower than the standard.

Configuration 5

In the control system according to configuration 4, the estimation unit is further configured to determine whether the risk of droplet infection is higher than the standard based on an environment inside the vehicle or a traveling condition of the vehicle.

Configuration 6

The control system according to any one of configurations 1 to 5 further includes a travel control unit configured to prohibit the vehicle from traveling until the determination unit determines that the occupant has put on the anti-droplet protective equipment after the determination unit determines that the occupant is not wearing the anti-droplet protective equipment.

Configuration 7

The control system according to any one of configurations 1 to 6 further includes a payment unit configured to pay for the anti-droplet protective equipment together with or separately from a boarding fare of the vehicle when the occupant has received the anti-droplet protective equipment provided by the anti-droplet protective equipment providing device.

Configuration 8

The vehicle control system according to any one of configurations 1 to 7, wherein the vehicle is a shared vehicle.

Configuration 9

In a control method for a vehicle, the vehicle includes a camera mounted on the vehicle and configured to take an image of an occupant of the vehicle, and an anti-droplet protective equipment providing device mounted on the vehicle and configured to provide anti-droplet protective equipment to the occupant. The control method includes: determining whether the occupant is wearing the anti-droplet protective equipment based on the image of the occupant taken by the camera; and providing the anti-droplet protective equipment to the occupant with the anti-droplet protective equipment providing device when determining that the occupant is not wearing the anti-droplet protective equipment.

It is possible to restrain discomfort caused by an occupant of the vehicle not wearing the anti-droplet protective equipment.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
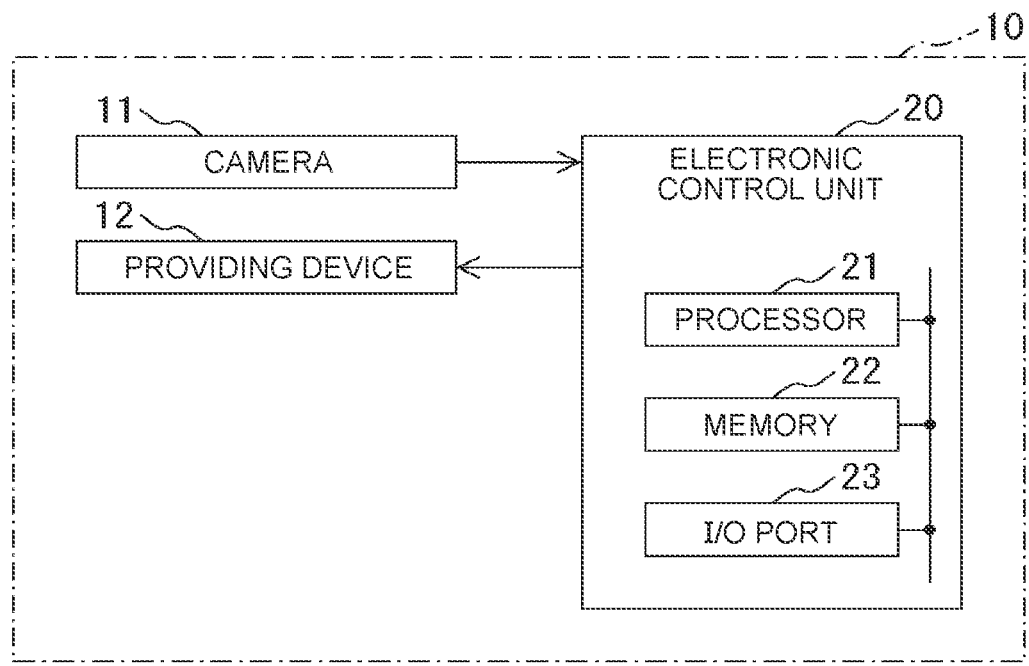
FIG. 1 is a schematic overall view of a vehicle of a first embodiment according to the present disclosure.

FIG. 1 schematically shows a vehicle 10 of a first embodiment according to the present disclosure. In one example, the vehicle 10 is a shared vehicle such as a route bus. In another embodiment, the vehicle 10 is a private car. As shown in FIG. 1, the vehicle 10 of the first embodiment according to the present disclosure includes a camera 11, an anti-droplet protective equipment providing device 12, and an electronic control unit 20.

The camera 11 of the first embodiment according to the present disclosure is mounted on the vehicle 10 and takes images of occupants of the vehicle 10. In one example, the camera 11 is installed at the entrance/exit of the vehicle 10 and takes images of the occupants of the vehicle 10, particularly the occupants who are getting into the vehicle 10 or who have just got into the vehicle 10.

The anti-droplet protective equipment providing device 12 of the first embodiment according to the present disclosure is mounted on the vehicle 10 to provide anti-droplet protective equipment to the occupant. In one example, the anti-droplet protective equipment providing device 12 is installed at the entrance/exit of the vehicle 10. The anti-droplet protective equipment of the first embodiment according to the present disclosure includes a (surgical) mask, a face shield, and the like.

The electronic control unit 20 of the first embodiment according to the present disclosure includes one or a plurality of processors 21, one or a plurality of memories 22, and an input-output (I/O) port 23 that are connected so as to be able to communicate with each other through a bidirectional bus. The memory 22 includes, for example, a read only memory (ROM), a random access memory (RAM), and the like. Various programs are stored in the memory 22, and various functions are realized as these programs are executed by the processor 21. The above-mentioned camera 11 and the anti-droplet protective equipment providing device 12 are connected to the input-output port 23 of the first embodiment according to the present disclosure so as to be able to communicate therewith.

Figure 2:
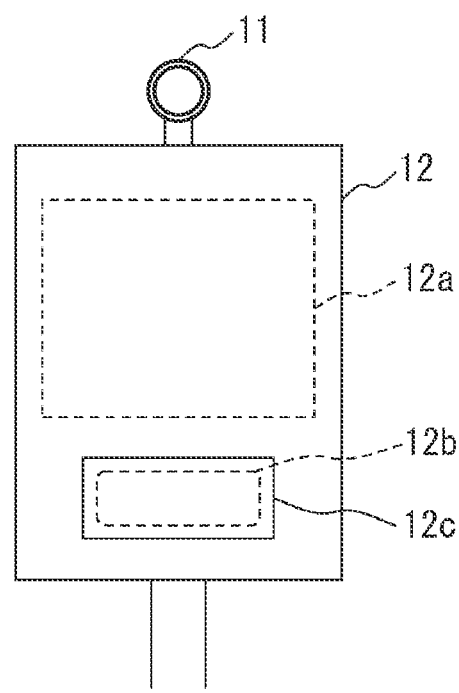
FIG. 2 is a schematic diagram of an anti-droplet protective equipment providing device of the embodiment according to the present disclosure.

FIG. 2 shows an example of the anti-droplet protective equipment providing device 12. The anti-droplet protective equipment providing device 12 of the example shown in FIG. 2 includes a storage chamber 12a for storing the anti-droplet protective equipment, an outlet 12b for taking out the anti-droplet protective equipment, and a lid 12c for opening or closing the outlet 12b. When the anti-droplet protective equipment should be provided, the anti-droplet protective equipment is brought to the outlet 12b from the storage chamber 12a, and the lid 12c is moved to the open position. As a result, the occupant can take out the anti-droplet protective equipment from the outlet 12b. In contrast, when provision of the anti-droplet protective equipment should be ended, the lid 12c is held in the closed position. As a result, the occupant cannot take out the anti-droplet protective equipment from the anti-droplet protective equipment providing device 12. In the example shown in FIG. 2, the camera 11 is attached to the anti-droplet protective equipment providing device 12.

In the first embodiment according to the present disclosure, it is determined whether the occupant of the vehicle 10 is wearing the anti-droplet protective equipment based on the image of the camera 11. When the occupant is not wearing the anti-droplet protective equipment, the anti-droplet protective equipment providing device 12 is controlled so as to provide the anti-droplet protective equipment to the occupant. As a result, the occupant is prompted to wear the anti-droplet protective equipment. Thus, discomfort caused by not wearing the anti-droplet protective equipment is restrained.

Figure 3:
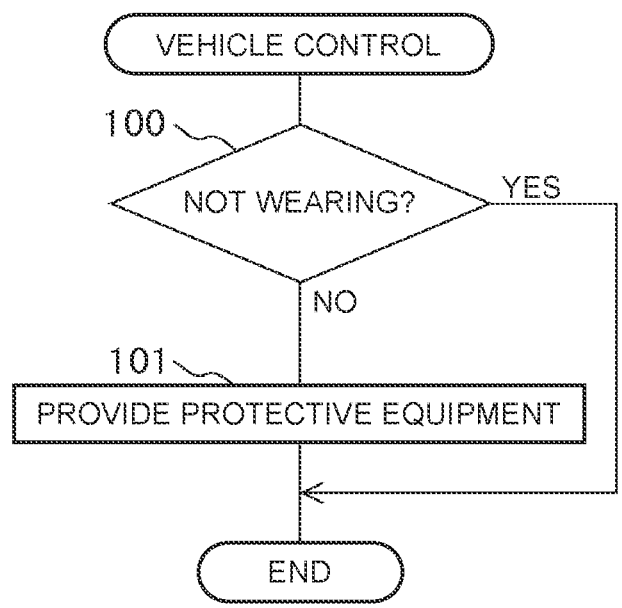
FIG. 3 is a flowchart for executing a vehicle control routine of the first embodiment according to the present disclosure.

FIG. 3 shows a routine for performing vehicle control of the first embodiment according to the present disclosure. This routine is repeated, for example, at predetermined set times. With reference to FIG. 3, in step 100, it is determined whether the occupant of the vehicle 10 is wearing the anti-droplet protective equipment. When it is determined that the occupant is wearing the anti-droplet protective equipment, the processing cycle is terminated. In contrast, when it is determined that the occupant is not wearing the anti-droplet protective equipment, the process proceeds to step 101, and the anti-droplet protective equipment providing device 12 provides the anti-droplet protective equipment to the occupant.

Next, a second embodiment according to the present disclosure will be described. Differences from the first embodiment according to the present disclosure will be described. In the second embodiment according to the present disclosure, when it is determined that the occupant has put on the anti-droplet protective equipment after it is determined that the occupant is not wearing the anti-droplet protective equipment, provision of the anti-droplet protective equipment by the anti-droplet protective equipment providing device 12 is stopped. After the occupant receives the anti-droplet protective equipment provided by the anti-droplet protective equipment providing device 12 and puts on the anti-droplet protective equipment, or after the occupant puts on the anti-droplet protective equipment prepared by himself/herself, it is not necessary to provide the anti-droplet protective equipment by the anti-droplet protective equipment providing device 12. Therefore, unnecessary provision of the anti-droplet protective equipment is restrained.

Figure 4:
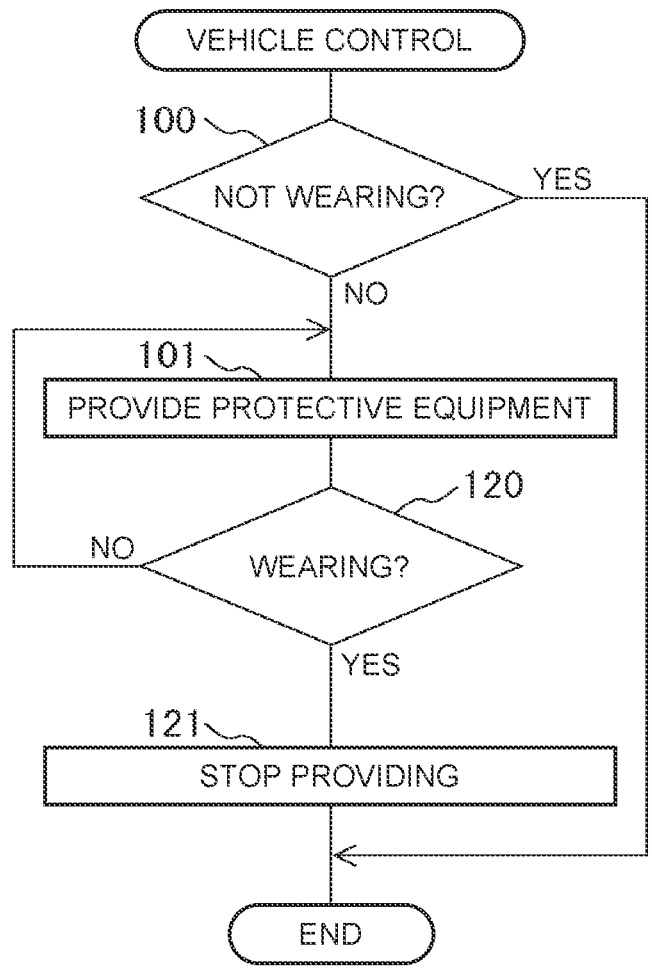
FIG. 4 is a flowchart for executing a vehicle control routine of a second embodiment according to the present disclosure.

FIG. 4 shows a routine for performing vehicle control of the second embodiment according to the present disclosure. Differences from the routine shown in FIG. 3 will be described. In the routine shown in FIG. 4, following step 101, it is determined whether the occupant is wearing the anti-droplet protective equipment in step 120. When it is not determined that the occupant is wearing the anti-droplet protective equipment, the process returns to step 101. In contrast, when it is determined that the occupant is wearing the anti-droplet protective equipment, the process proceeds to step 121, and provision of the anti-droplet protective equipment by the anti-droplet protective equipment providing device 12 is stopped.

Figure 5:
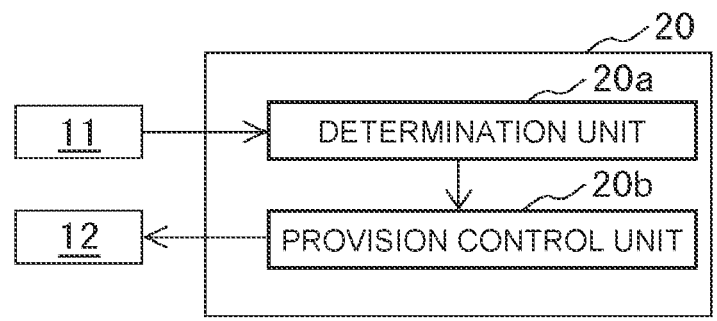
FIG. 5 is a functional block diagram of an electronic control unit of the first and second embodiments according to the present disclosure.

FIG. 5 shows a functional block diagram of the electronic control unit 20 of the first and second embodiments according to the present disclosure. With reference to FIG. 5, the electronic control unit 20 of the first and second embodiments according to the present disclosure includes: a determination unit 20a configured to determine whether the occupant is wearing the anti-droplet protective equipment based on the image of the occupant taken by the camera 11; and a provision control unit 20b configured to provide the anti-droplet protective equipment to the occupant with the anti-droplet protective equipment providing device 12 when the determination unit 20a determines that the occupant is not wearing the anti-droplet protective equipment.

Further, the provision control unit 20b of the second embodiment according to the present disclosure is configured to stop provision of the anti-droplet protective equipment by the anti-droplet protective equipment providing device 12 when the determination unit 20a determines that the occupant has put on the anti-droplet protective equipment after the determination unit 20a determines that the occupant is not wearing the anti-droplet protective equipment.

Figure 6:
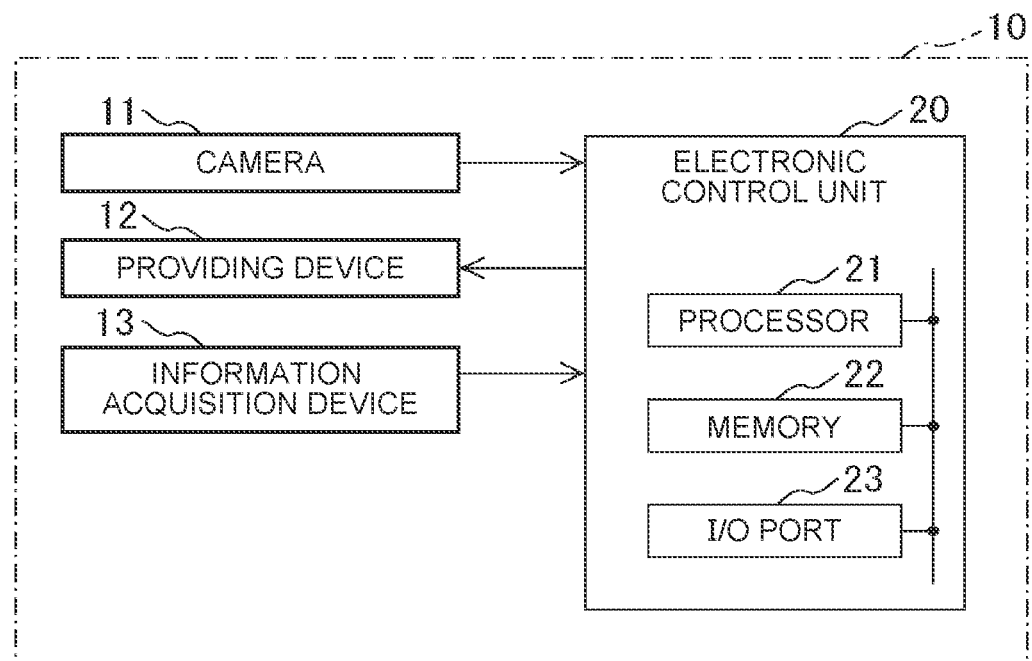
FIG. 6 is a schematic overall view of a vehicle of a third embodiment according to the present disclosure.

Next, a third embodiment according to the present disclosure will be described. Differences from the first embodiment according to the present disclosure will be described. In the third embodiment according to the present disclosure, as shown in FIG. 6, an information acquisition device 13 is provided so as to be able to communicate with the electronic control unit 20. The information acquisition device 13 of the third embodiment according to the present disclosure is mounted on the vehicle 10 and acquires related information of the occupant. In one example, the information acquisition device 13 is installed at the entrance/exit of the vehicle 10. Examples of the related information of the occupant include, for example, gender, age, physique, preferences for anti-droplet protective equipment (size, color, pattern, quality, structure, brand, and the like) of the occupant. Examples of the information acquisition device 13 include the camera 11 that takes an image of the occupant, a reader that reads the related information from the storage medium of the occupant, and the like. Examples of the storage medium include an integrated circuit (IC) card, a smartphone, a wearable device, and the like. Thus, in one example, when the occupant holds the IC card over the card reader when getting into the vehicle 10, the related information of the occupant stored in the IC card is read and transmitted to the electronic control unit 20.

Further, in the storage chamber 12a of the anti-droplet protective equipment providing device 12 of the third embodiment according to the present disclosure, a plurality of types (sizes, colors, patterns, quality levels, structures, brands, and the like) of anti-droplet protective equipment is stored.

In the third embodiment according to the present disclosure, anti-droplet protective equipment that suits the occupant is selected based on the related information of the occupant that is acquired by the information acquisition device 13. Next, the selected anti-droplet protective equipment is provided to the occupant by the anti-droplet protective equipment providing device 12. In one example, when the size of the anti-droplet protective equipment preferred by the occupant is acquired, the anti-droplet protective equipment of the size is selected from the anti-droplet protective equipment of a plurality of sizes, and the selected anti-droplet protective equipment is provided to the occupant by the anti-droplet protective equipment providing device 12. As a result, anti-droplet protective equipment that suits the occupant is provided, and the occupant is further prompted to wear the anti-droplet protective equipment.

Figure 7:
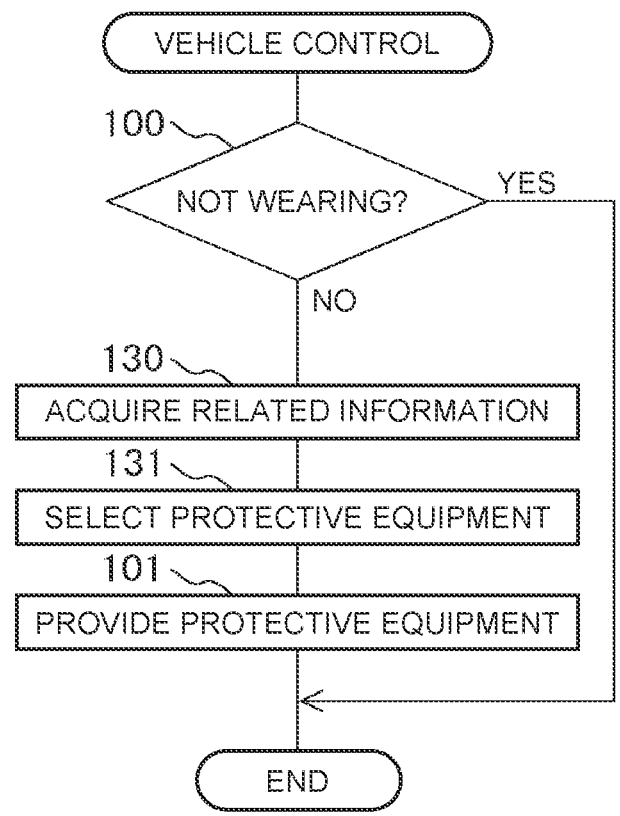
FIG. 7 is a flowchart for executing a vehicle control routine of the third embodiment according to the present disclosure.

FIG. 7 shows a routine for performing vehicle control of the third embodiment according to the present disclosure. Differences from the routine shown in FIG. 3 will be described. In the routine shown in FIG. 4, when it is determined in step 100 that the occupant is not wearing the anti-droplet protective equipment, the process proceeds to step 130, and the information acquisition device 13 acquires the related information of the occupant. In the following step 131, anti-droplet protective equipment that suits the occupant is selected based on the acquired related information. In the following step 101, the selected anti-droplet protective equipment is provided to the occupant.

Figure 8:
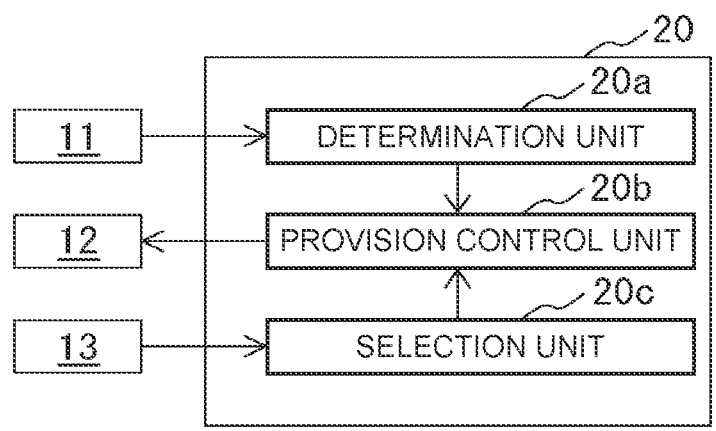
FIG. 8 is a functional block diagram of an electronic control unit of the third embodiment according to the present disclosure.

FIG. 8 shows a functional block diagram of the electronic control unit 20 of the third embodiment according to the present disclosure. Differences from the functional block diagram of FIG. 5 will be described. The electronic control unit 20 of the third embodiment according to the present disclosure further includes a selection unit 20c configured to select anti-droplet protective equipment that suits the occupant based on the related information of the occupant that is acquired by the information acquisition device 13. In this example, the provision control unit 20b is further configured to provide the anti-droplet protective equipment selected by the selection unit 20c to the occupant.

Figure 9:
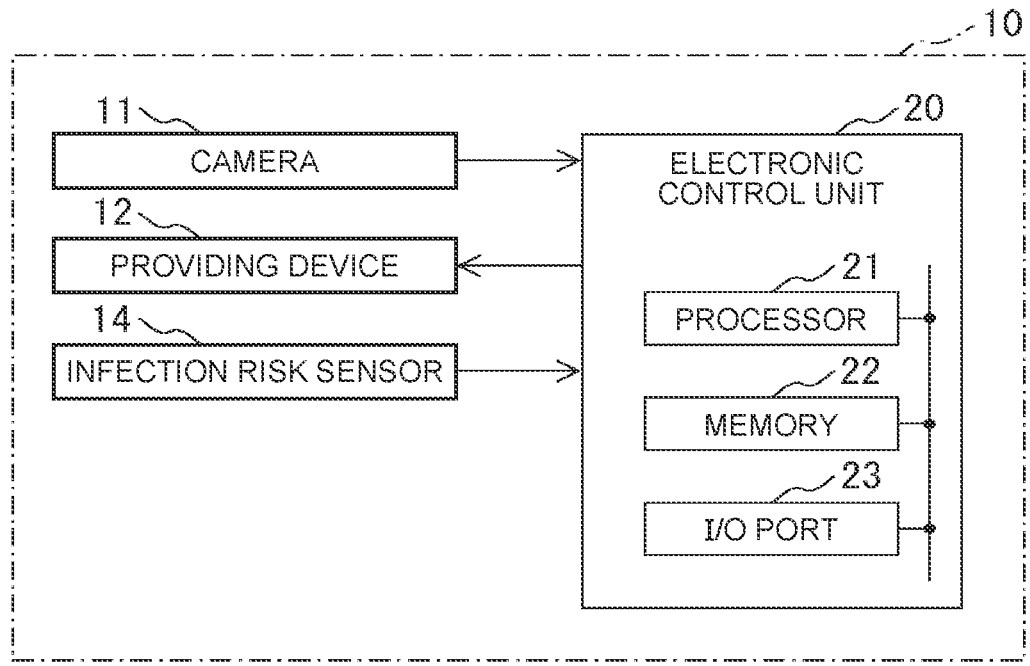
FIG. 9 is a schematic overall view of a vehicle of a fourth embodiment according to the present disclosure.

Next, a fourth embodiment according to the present disclosure will be described. Differences from the first embodiment according to the present disclosure will be described. In the fourth embodiment according to the present disclosure, as shown in FIG. 9, an infection risk sensor 14 is provided so as to be able to communicate with the electronic control unit 20. The infection risk sensor 14 of the fourth embodiment according to the present disclosure is mounted on the vehicle 10 and detects a state quantity representing the risk of droplet infection in the vehicle 10. Examples of the state quantity representing the risk of droplet infection include at least one of the number of occupants in the vehicle 10, the body temperature of the occupant, the carbon dioxide concentration, the temperature, and the like. For example, when the number of occupants in the vehicle 10 is large, the risk of droplet infection is considered to be higher than that when the number of occupants is small.

In the fourth embodiment according to the present disclosure, when it is determined that the occupant is not wearing the anti-droplet protective equipment, it is estimated whether the risk of droplet infection in the vehicle 10 is higher than a predetermined standard, based on the state quantity detected by the droplet infection risk sensor 14. When it is estimated that the risk of droplet infection is higher than the standard, provision of the anti-droplet protective equipment to the occupant by the anti-droplet protective equipment providing device 12 is performed. In contrast, when it is not estimated that the risk of droplet infection is higher than the standard, provision of the anti-droplet protective equipment to the occupant by the anti-droplet protective equipment providing device 12 is stopped or not performed. As a result, when the necessity of wearing the anti-droplet protective equipment is low, provision of the anti-droplet protective equipment is stopped, and thus, the anti-droplet protective equipment is effectively used. In addition, occupant discomfort caused by wearing or providing anti-droplet protective equipment.

Figure 10:
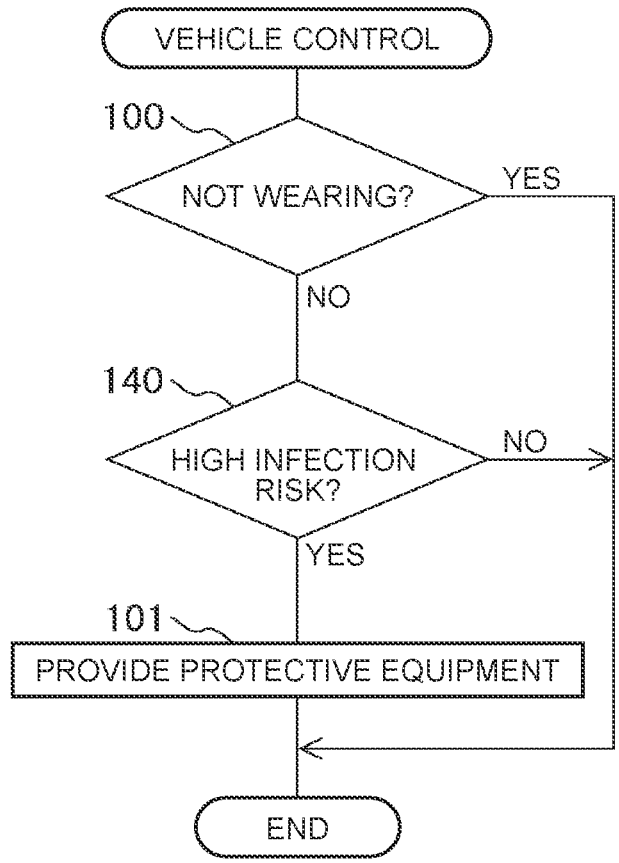
FIG. 10 is a flowchart for executing a vehicle control routine of the fourth embodiment according to the present disclosure.

FIG. 10 shows a routine for performing vehicle control of the fourth embodiment according to the present disclosure. Differences from the routine shown in FIG. 3 will be described. In the routine shown in FIG. 10, when it is determined in step 100 that the occupant is not wearing the anti-droplet protective equipment, the process proceeds to step 140, and it is determined whether the risk of droplet infection is higher than the standard. When it is determined that the risk of droplet infection is higher than the standard, the process proceeds to step 101, and provision of the anti-droplet protective equipment is performed. In contrast, when it is not determined that the risk of droplet infection is higher than the standard, the processing cycle is terminated. As a result, provision of the anti-droplet protective equipment is stopped or not performed.

Figure 11:
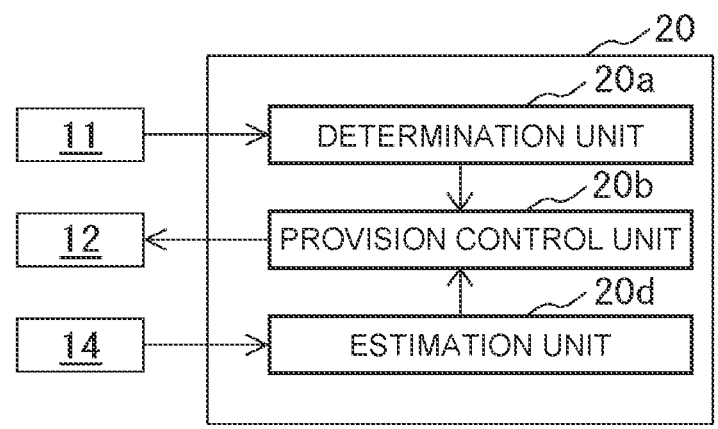
FIG. 11 is a functional block diagram of an electronic control unit of the fourth embodiment according to the present disclosure.

FIG. 11 shows a functional block diagram of the electronic control unit 20 of the fourth embodiment according to the present disclosure. Differences from the functional block diagram of FIG. 5 will be described. The electronic control unit 20 of the fourth embodiment according to the present disclosure further includes an estimation unit 20d configured to estimate whether the risk of droplet infection in the vehicle 10 is higher than a predetermined standard. The provision control unit 20b is further configured to perform provision of the anti-droplet protective equipment to the occupant with the anti-droplet protective equipment providing device 12 when the determination unit 20a determines that the occupant is not wearing the anti-droplet protective equipment and the estimation unit 20d estimates that the risk of droplet infection is higher than the standard, and stop provision of the anti-droplet protective equipment to the occupant with the anti-droplet protective equipment providing device 12 when the estimation unit 20d estimates that the risk of droplet infection is lower than the standard.

In the example shown in FIG. 11, the estimation unit 20d performs estimation based on the output of the droplet infection risk sensor 14. In another example, the estimation unit 20d performs estimation based on the traveling conditions of the vehicle 10. Examples of the traveling conditions of the vehicle 10 include a traveling route (whether it is an urban area or a residential area, and the like) and a traveling time (time zone, day of the week, and the like). The traveling conditions of the vehicle 10 are stored in advance in, for example, the memory 22 of the electronic control unit 20 or another storage device inside or outside the vehicle 10.

Figure 12:
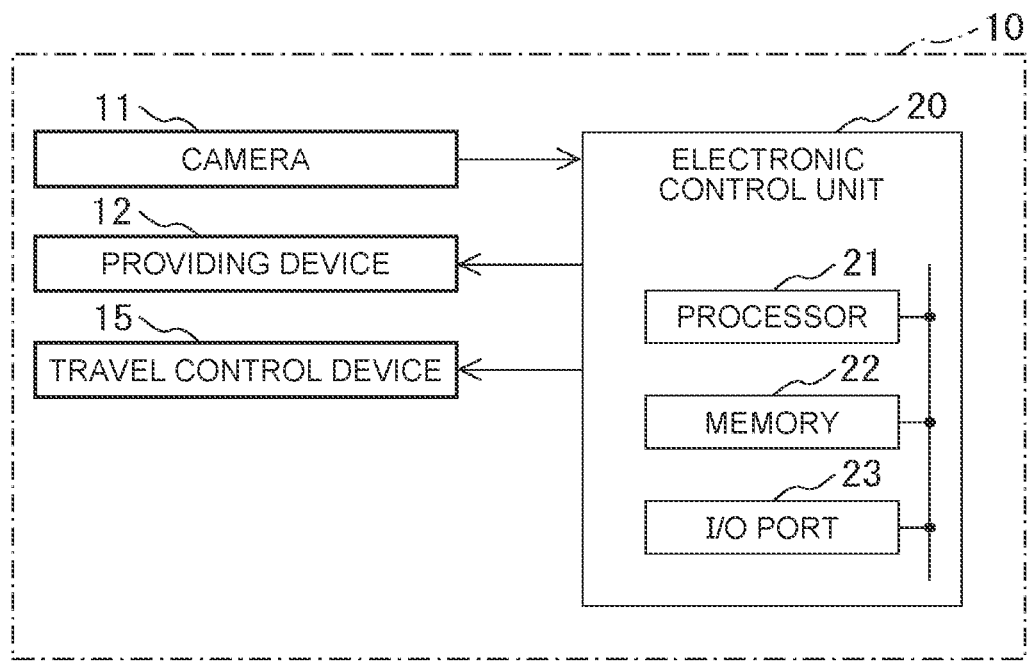
FIG. 12 is a schematic overall view of a vehicle of a fifth embodiment according to the present disclosure.

Next, a fifth embodiment according to the present disclosure will be described. Differences from the first embodiment according to the present disclosure will be described. In the fifth embodiment according to the present disclosure, as shown in FIG. 12, a travel control device 15 is provided so as to be able to communicate with the electronic control unit 20. The travel control device 15 of the fifth embodiment according to the present disclosure controls traveling of the vehicle 10, for example, one or both of driving and braking. In one example, the travel control device 15 prohibits the vehicle 10 from traveling regardless of, for example, operation by the occupant or the driver. In other words, the travel control device 15 keeps the vehicle 10 in a stopped state.

Also in the fifth embodiment according to the present disclosure, when it is determined that the occupant is not wearing the anti-droplet protective equipment, the anti-droplet protective equipment providing device 12 provides the anti-droplet protective equipment. Next, it is determined whether the occupant has put on the anti-droplet protective equipment, and the travel control device 15 prohibits the vehicle 10 from traveling until it is determined that the occupant has put on the anti-droplet protective equipment. In contrast, when it is determined that the occupant has put on the anti-droplet protective equipment, the vehicle 10 is allowed to travel. As a result, discomfort of other occupants caused by the occupant not wearing the anti-droplet protective equipment is reduced.

Figure 13:
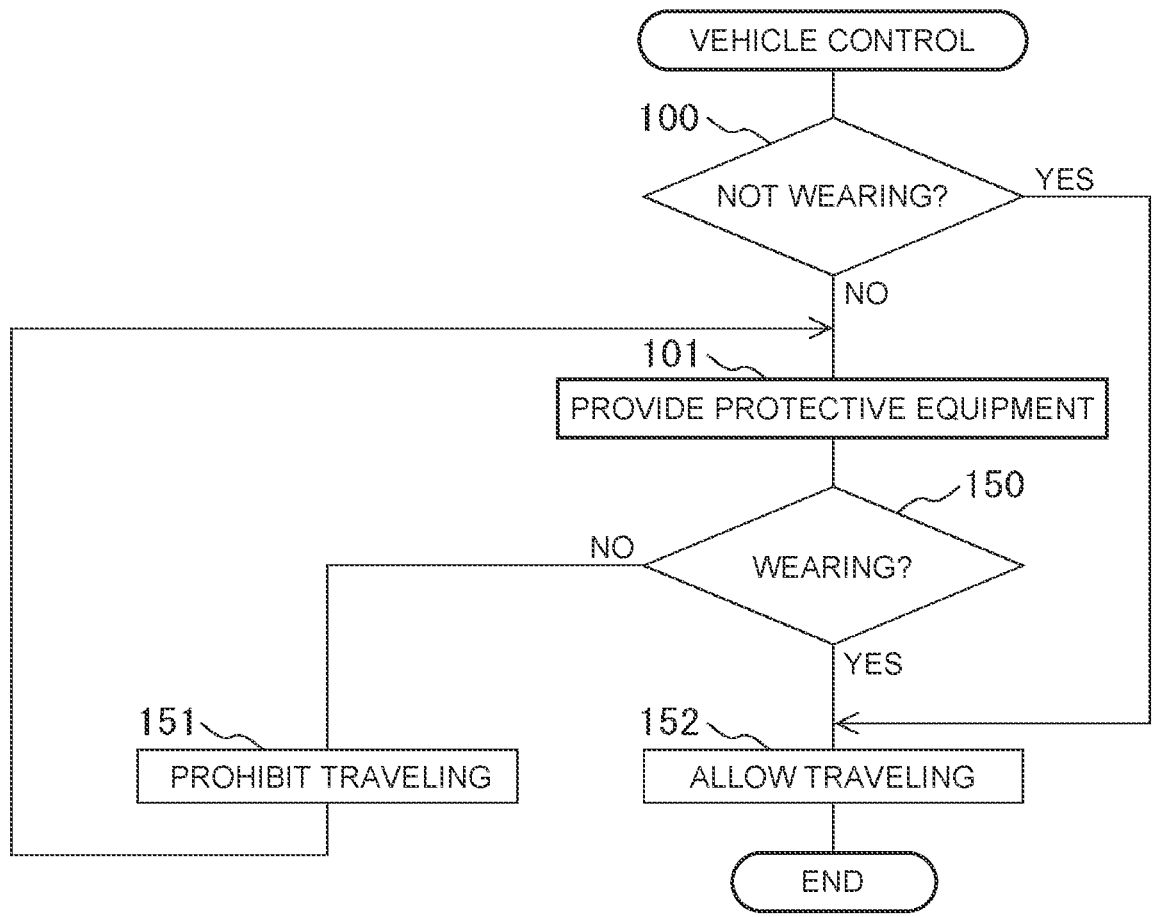
FIG. 13 is a flowchart for executing a vehicle control routine of the fifth embodiment according to the present disclosure.

FIG. 13 shows a routine for performing vehicle control of the fifth embodiment according to the present disclosure. Differences from the routine shown in FIG. 3 will be described. In the routine shown in FIG. 13, following step 101, the process proceeds to step 150, and it is determined whether the occupant is wearing the anti-droplet protective equipment. When it is determined that the occupant is not wearing the anti-droplet protective equipment, the process proceeds to step 151, and the vehicle 10 is prohibited from traveling. Then, the process returns to step 101. In contrast, when it is determined that the occupant is not wearing the anti-droplet protective equipment, the process proceeds to step 152, and the vehicle 10 is allowed to travel.

Figure 14:
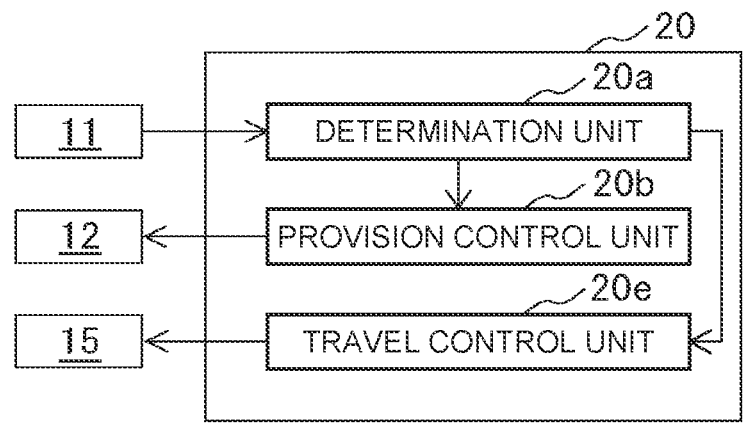
FIG. 14 is a functional block diagram of an electronic control unit of the fifth embodiment according to the present disclosure.

FIG. 14 shows a functional block diagram of the electronic control unit 20 of the fifth embodiment according to the present disclosure. Differences from the functional block diagram of FIG. 5 will be described. The electronic control unit 20 of the fifth embodiment according to the present disclosure further includes a travel control unit 20e configured to prohibit the vehicle 10 from traveling until the determination unit 20a determines that the occupant has put on the anti-droplet protective equipment after the determination unit 20a determines that the occupant is not wearing the anti-droplet protective equipment. In the example shown in FIG. 14, the travel control unit 20e prohibits the vehicle 10 from traveling with the travel control device 15.

Figure 15:
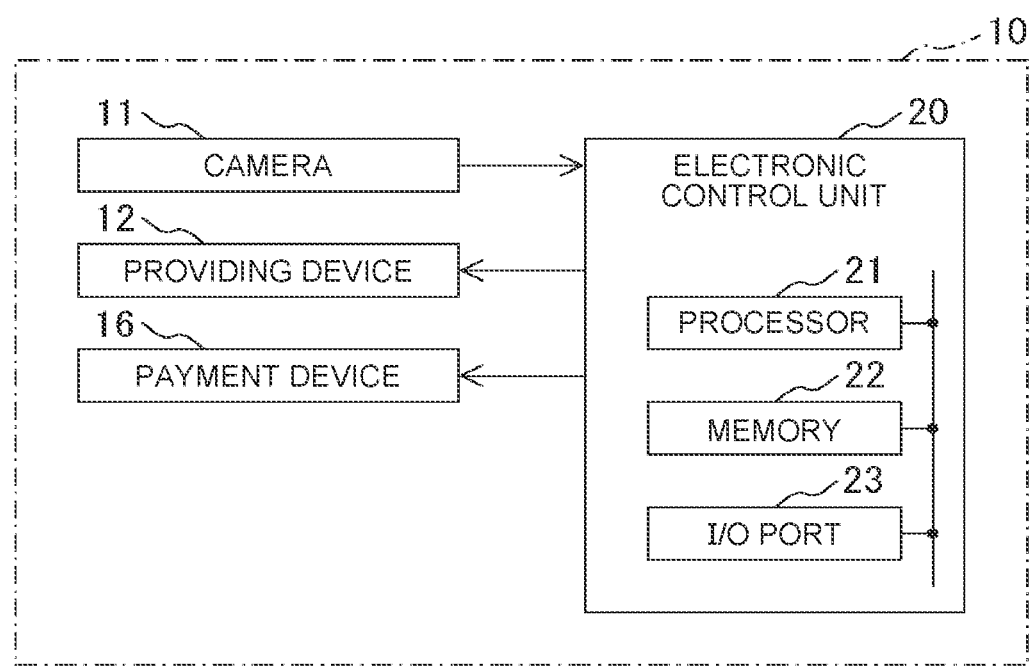
FIG. 15 is a schematic overall view of a vehicle of a sixth embodiment according to the present disclosure.

Next, a sixth embodiment according to the present disclosure will be described. Differences from the first embodiment according to the present disclosure will be described. In the sixth embodiment according to the present disclosure, as shown in FIG. 15, a payment device 16 is provided so as to be able to communicate with the electronic control unit 20. The payment device 16 of the sixth embodiment according to the present disclosure is mounted on the vehicle 10 and performs payment processing for the occupant. Examples of the payment device 16 includes a reader/writer that reads and writes electronic money information of the occupant in the storage medium.

In the sixth embodiment according to the present disclosure, it is determined whether the occupant has received the anti-droplet protective equipment provided by the anti-droplet protective equipment providing device 12, and when the occupant has received the anti-droplet protective equipment provided by the anti-droplet protective equipment providing device 12, payment for the anti-droplet protective equipment is made. In one example, the payment for the anti-droplet protective equipment is made together with the payment of the boarding fare of the vehicle 10. In another example, the payment for the anti-droplet protective equipment is made separately from the payment of the boarding fare of the vehicle 10. With this, the payment for the anti-droplet protective equipment can be easily made. In one example, when it is determined that the anti-droplet protective equipment has been taken out from the anti-droplet protective equipment providing device 12 after the anti-droplet protective equipment is provided by the anti-droplet protective equipment providing device 12, it is determined that the occupant has received the anti-droplet protective equipment from the anti-droplet protective equipment providing device 12.

Figure 16:
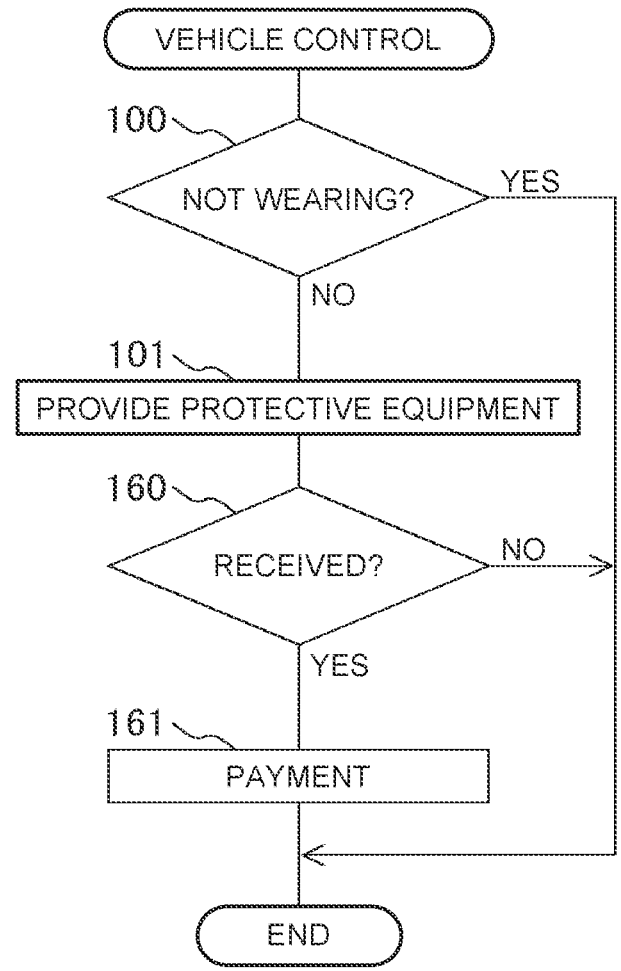
FIG. 16 is a flowchart for executing a vehicle control routine of the sixth embodiment according to the present disclosure.

FIG. 16 shows a routine for performing vehicle control of the sixth embodiment according to the present disclosure. Differences from the routine shown in FIG. 3 will be described. In the routine shown in FIG. 16, following step 101, it is determined whether the occupant has received the anti-droplet protective equipment from the anti-droplet protective equipment providing device 12 in step 160. When it is determined that the occupant has received the anti-droplet protective equipment from the anti-droplet protective equipment providing device 12, the process proceeds to step 161 and the payment for the anti-droplet protective equipment is made. In contrast, when it is not determined that the occupant has received the anti-droplet protective equipment from the anti-droplet protective equipment providing device 12, the processing cycle is terminated.

Figure 17:
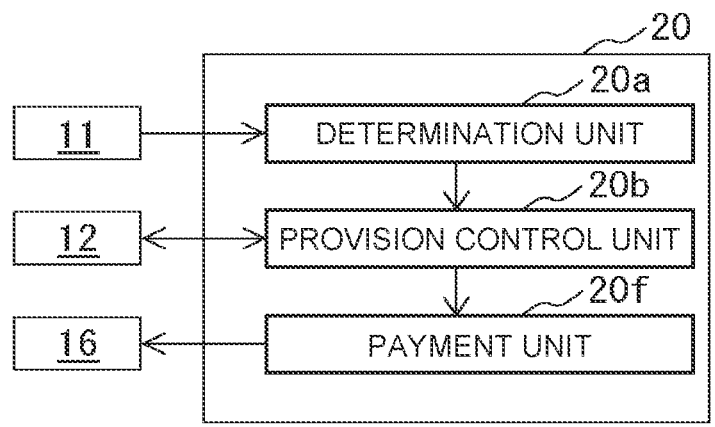
FIG. 17 is a functional block diagram of an electronic control unit of the sixth embodiment according to the present disclosure.

FIG. 17 shows a functional block diagram of the electronic control unit 20 of the sixth embodiment according to the present disclosure. Differences from the functional block diagram of FIG. 5 will be described. The electronic control unit 20 of the sixth embodiment according to the present disclosure further includes a payment unit 20f configured to pay for the anti-droplet protective equipment together with the boarding fare of the vehicle 10 or separately from the boarding fare when the occupant has received the anti-droplet protective equipment provided by the anti-droplet protective equipment providing device 12. In the example shown in FIG. 17, the payment unit 20f makes payment with the payment device 16.

What is claimed is:

1. A control system for a vehicle, the control system comprising:

a camera mounted on the vehicle and configured to take an image of an occupant of the vehicle;

an anti-droplet protective equipment providing device mounted on the vehicle and configured to provide anti-droplet protective equipment to the occupant;

one or more processors configured to determine whether the occupant is wearing the anti-droplet protective equipment based on the image of the occupant taken by the camera;

the one more processors further configured to provide the anti-droplet protective equipment to the occupant with the anti-droplet protective equipment providing device when the one more processors determine that the occupant is not wearing the anti-droplet protective equipment;

an information acquisition device configured to acquire related information of the occupant, the related information including gender, physique, and preferences including color, size, pattern, and brand for the anti-droplet protective equipment;

the one or more processors are further configured to select the anti-droplet protective equipment that suits the occupant based on the related information of the occupant that is acquired by the information acquisition device, wherein the one or more processors are further configured to provide the anti-droplet protective equipment selected by the one or more processors to the occupant with the anti-droplet protective equipment providing device;

the one or more processors are further configured to estimate whether a risk of droplet infection in the vehicle is higher than a predetermined standard based on a traveling condition of the vehicle that includes a type of traveling route and a traveling time, the traveling condition being stored in advance, the one or more processors are further configured to, when the one more processors determine that the occupant is not wearing the anti-droplet protective equipment, perform provision of the anti-droplet protective equipment to the occupant by the anti-droplet protective equipment providing device when the one or more processors estimate that the risk of droplet infection is higher than the predetermined standard, and stop provision of the anti-droplet protective equipment to the occupant by the anti-droplet protective equipment providing device when the one or more processors estimate that the risk of droplet infection is lower than the predetermined standard; and an infection risk sensor that is configured to detect a state quantity representing the risk of droplet infection, the state quantity including a number of vehicle occupants.

2. The control system according to claim 1, wherein the one or more processors are further configured to stop provision of the anti-droplet protective equipment by the anti-droplet protective equipment providing device when the one more processors determine that the occupant has put on the anti-droplet protective equipment after the one more processors determine that the occupant is not wearing the anti-droplet protective equipment.

3. The control system according to claim 1, wherein the one or more processors are further configured to prohibit the vehicle from traveling until the one more processors determine that the occupant has put on the anti-droplet protective equipment after the one more processors determine that the occupant is not wearing the anti-droplet protective equipment.

4. The control system according to claim 1, wherein the one or more processors are further configured to pay for the anti-droplet protective equipment together with or separately from a boarding fare of the vehicle when the occupant has received the anti-droplet protective equipment provided by the anti-droplet protective equipment providing device.

5. The control system according to claim 1, wherein the vehicle is a shared vehicle.

6. A control method for a vehicle, the vehicle including a camera mounted on the vehicle and configured to take an image of an occupant of the vehicle, and an anti-droplet protective equipment providing device mounted on the vehicle and configured to provide anti-droplet protective equipment to the occupant, the control method comprising:

determining whether the occupant is wearing the anti-droplet protective equipment based on the image of the occupant taken by the camera;

providing the anti-droplet protective equipment to the occupant with the anti-droplet protective equipment providing device when determining that the occupant is not wearing the anti-droplet protective equipment;

acquiring, via an information acquisition device, related information of the occupant, the related information including gender, physique, and preferences including color, size, pattern, and brand for the anti-droplet protective equipment;

selecting the anti-droplet protective equipment that suits the occupant based on the related information of the occupant that is acquired by the information acquisition device, and providing the anti-droplet protective equipment to the occupant with the anti-droplet protective equipment providing device;

estimating whether a risk of droplet infection in the vehicle is higher than a predetermined standard based on a traveling condition of the vehicle that includes a type of traveling route and a traveling time, the traveling condition being stored in advance, and further, when determining that the occupant is not wearing the anti-droplet protective equipment, performing provision of the anti-droplet protective equipment to the occupant by the anti-droplet protective equipment providing device when estimating that the risk of droplet infection is higher than the predetermined standard, and stopping provision of the anti-droplet protective equipment to the occupant by the anti-droplet protective equipment providing device when estimating that the risk of droplet infection is lower than the predetermined standard; and detecting, by an infection risk sensor, a state quantity representing the risk of droplet infection, the state quantity including a number of vehicle occupants.

* * * * *